(12) United States Patent
Gudme

(10) Patent No.: US 8,474,489 B2
(45) Date of Patent: *Jul. 2, 2013

(54) FLEXIBLE PIPE

(75) Inventor: Jonas Gudme, Rødovre (DK)

(73) Assignee: National Oilwell Varco Denmark, Brondby (DE)

( * ) Notice: Subject to any disclaimer, the term of this patent is extended or adjusted under 35 U.S.C. 154(b) by 601 days.

This patent is subject to a terminal disclaimer.

(21) Appl. No.: 12/520,704

(22) PCT Filed: Dec. 17, 2007

(86) PCT No.: PCT/DK2007/050189
§ 371 (c)(1),
(2), (4) Date: Jun. 22, 2009

(87) PCT Pub. No.: WO2008/077410
PCT Pub. Date: Jul. 3, 2008

(65) Prior Publication Data
US 2010/0089478 A1    Apr. 15, 2010

(30) Foreign Application Priority Data

Dec. 22, 2006  (DK) .................................. 2006 01706
Aug. 23, 2007  (DK) .................................. 2007 01205

(51) Int. Cl.
*F16L 55/00*  (2006.01)
(52) U.S. Cl.
USPC ............................ 138/104; 138/135; 138/136
(58) Field of Classification Search
USPC ......................................... 138/104, 135, 136
See application file for complete search history.

(56) References Cited

U.S. PATENT DOCUMENTS 714,429 A * 11/1902 Witzenmann ................. 138/136
3,340,900 A   9/1967 Spurlock (Continued)

FOREIGN PATENT DOCUMENTS

EP        0321262 B1     11/1992
WO     WO 00/36324       6/2000

(Continued)

OTHER PUBLICATIONS

Felix-Henry, "Thermal Performances of the Flexible Bundled Risers", Houston, TX, 2002, Technip-Coflexip, Offshore Technology Conference.

(Continued)

*Primary Examiner* — James Hook
(74) *Attorney, Agent, or Firm* — Pearne & Gordon LLP

(57) ABSTRACT

The invention relates to a flexible pipe comprising a plurality of layers surrounding a longitudinal axis and an at least partly integrated sensor arrangement. The plurality of layers comprising an internal sheath and one or more armouring layers, at least one armouring layer comprising at least one folded metal strip helically wound around said longitudinal axis of the pipe, at least a part of said sensor arrangement being placed in a fold of said folded metal strip, the sensor arrangement preferably comprises an optical fiber which is placed in the fold of said folded metal strip. By this flexible pipe with a sensor arrangement, the sensor arrangement may be incorporated into the armouring layer in a simple and safe way. The sensor arrangement may for example be capable of sensing at least one property, selected from the group of stress-strain, temperature, pipe leakage, wear, mechanical deformations, pressure, chemical corrosion, salt concentration of liquid in contact with the pipe and pH value of liquid in contact with the pipe.

36 Claims, 6 Drawing Sheets

U.S. PATENT DOCUMENTS

| | | | |
|---|---|---|---|
| 3,641,658 A | 2/1972 | Chevalier et al. | |
| 4,364,418 A | 12/1982 | Genini et al. | |
| 4,549,581 A | 10/1985 | Unno et al. | |
| 4,697,875 A | 10/1987 | Priaroggia | |
| 5,343,738 A | 9/1994 | Skaggs | |
| 5,669,420 A | 9/1997 | Herrero et al. | |
| 5,730,188 A | 3/1998 | Kalman et al. | |
| 5,813,439 A | 9/1998 | Herrero et al. | |
| 6,024,135 A | 2/2000 | Nobileau | |
| 6,065,501 A | 5/2000 | Feret et al. | |
| 6,085,799 A | 7/2000 | Kodaissi et al. | |
| 6,110,550 A | 8/2000 | Jarrin et al. | |
| 6,123,114 A | 9/2000 | Seguin et al. | |
| 6,145,546 A | 11/2000 | Hardy et al. | |
| 6,192,941 B1 | 2/2001 | Mallen-Herrero et al. | |
| 6,235,793 B1 | 5/2001 | Bernat et al. | |
| 6,283,161 B1 | 9/2001 | Feret et al. | |
| 6,354,333 B1 | 3/2002 | Dupoiron et al. | |
| 6,408,891 B1 | 6/2002 | Jung et al. | |
| 6,415,825 B1 | 7/2002 | Dupoiron et al. | |
| 6,454,897 B1 | 9/2002 | Morand | |
| 6,668,867 B2 | 12/2003 | Espinasse et al. | |
| 6,691,743 B2 | 2/2004 | Espinasse | |
| 6,840,286 B2 | 1/2005 | Espinasse et al. | |
| 6,904,939 B2 | 6/2005 | Jung et al. | |
| 7,024,941 B2 | 4/2006 | Andersen | |
| 7,891,384 B2 * | 2/2011 | Binet et al. | 138/135 |
| 8,056,585 B2 * | 11/2011 | Gudme | 138/135 |
| 2004/0055550 A1 | 3/2004 | Smith | |
| 2004/0168521 A1 | 9/2004 | Andersen | |
| 2004/0261878 A1 * | 12/2004 | Jung et al. | 138/135 |
| 2006/0151042 A1 | 7/2006 | Stringfellow et al. | |
| 2011/0203695 A1 * | 8/2011 | Gudme | 138/129 |

FOREIGN PATENT DOCUMENTS

| | | |
|---|---|---|
| WO | WO 01/61232 | 8/2001 |
| WO | WO 01/81809 | 11/2001 |
| WO | 02/01104 A1 | 1/2002 |
| WO | WO 02/02309 | 1/2002 |
| WO | WO 02/42674 | 5/2002 |
| WO | 02/088659 A2 | 11/2002 |

OTHER PUBLICATIONS

Felix-Henry, et al., "Flexible Risers Technologies in Deepwater and Ultra Deepwater", Houston, TX, 2003, Technip-Coflexip, Global Offshore.

Felix-Henry, et al., "Flexible Pipes In-Service Monitoring", Vancouver, Canada, Jun. 20-25, 2004, 23rd International Conference on Offshore Mechanics and Arctic Engineering.

Andersen, et al., "Development of an Optical Monitoring System for Flexible Risers", Offshore Technology Conference, 2001, Houston, TX.

* cited by examiner

Hollow core of pipe

FLEXIBLE PIPE

This application is a National Stage Application of PCT/DK2007/050189, filed 17 Dec. 2007, which claims benefit of Serial No. PA 2006 01706, filed 22 Dec. 2006 in Denmark and Serial No. PA 2007 01205, filed 23 Aug. 2007 in Denmark and which applications are incorporated herein by reference. To the extent appropriate, a claim of priority is made to each of the above disclosed applications.

TECHNICAL FIELD

The invention relates to a flexible pipe which can be used for transportation of fluids and gasses, and in particular a flexible pipe of the type which is useful in water transportation, and in offshore transportation of crude oil e.g. from seabed to an installation or between installations as well as the flexible pipes called umbilicals.

BACKGROUND ART

The flexible pipes for offshore use are often unbounded pipes. The term "unbounded" means in this text that at least two of the layers of the pipe are not bonded to each other. Often unbounded flexible pipes comprise an internal sheath which forms a barrier against the outflow of the fluid which is conveyed through the pipe, and one or more armouring layers on the outer side of the internal sheath (outer armouring layer(s)). The flexible pipe may comprise additional layers such as a carcass which is an inner armouring layer to prevent the collapse of the internal sheath. An outer sheath may be provided with the object of forming a barrier against the ingress of fluids from the pipe surroundings to the armouring layers. In practice the pipe will normally comprise at least two armouring layers, which are not bonded to each other directly or indirectly via other layers along the pipe. Thereby the pipe becomes bendable and sufficiently flexible to roll up for transportation.

The above-mentioned type of flexible pipes is used, among other things, for off-shore as well as some on-shore applications for the transport of fluids and gases. Flexible pipes can e.g. be used for the transportation of fluids where very high or varying water pressures exist along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

An umbilical is a type of flexible pipe which is used for the transport of process liquids and hydraulic oil and for carrying light and power from an installation positioned at the surface of the sea and down to the oil wells on the seabed. Umbilicals are not directly involved in the transport of oil and gas, but may be necessary for the supply of the process liquids which, as mentioned, are to be used for the recovery of oil, as well as for the running of hydraulic pipes, electrical wires, fibre optics, etc. An umbilical may be combined with an oil/gas transporting pipe e.g. a riser to form an integrated production umbilical or an integrated service umbilical.

Often it is desired to measure one or more chemical, physical and/or mechanical actions to which the flexible pipe is exposed during use.

Sensors for measuring chemical, physical and/or mechanical actions are well known in the art. Sensors of the strain gauge type are frequently used for measuring forces that cause mechanical deformations, in which strain gauges the electrical resistance in a conductor is changed by a mechanical impact. Moreover, sensors monitoring changes in the properties of an optical component caused by mechanical deformations or temperature variations are known.

Sensors and possible transmission lines of sensors will hereinafter be referred to as sensor arrangements.

Clearly, the use of sensor arrangements of the above-mentioned type for monitoring flexible pipes requires that they be mounted well-protected so that they are not damaged in use.

In connection with flexible pipes where the structure of the pipes is of the so-called unbonded type, i.e. the structure comprises several layers and the layers must be capable of moving relative to each other in order for the pipe to remain flexible. Therefore, if the sensor arrangement was disposed freely between the layers, it would quickly be damaged.

Applicant has earlier provided a method of mounting such sensor arrangement in an armouring layer by providing a groove in an armouring wire and fixing the sensor arrangement in this groove with a glue and/or by mechanical deformation of the groove. This method is disclosed in U.S. Pat. No. 7,024,941.

The object of the invention is to provide an alternative flexible pipe with integrated sensor arrangement. The invention also relates to a method of mounting a sensor arrangement in a flexible pipe, ensuring that the sensor arrangement is well protected against undesirable mechanical impacts and is thus operationally reliable during the service life of the flexible pipe.

This object has been achieved by the invention as claimed.

DISCLOSURE OF INVENTION

The flexible pipe of the invention comprises a plurality of layers surrounding a longitudinal axis and an at least partly integrated sensor arrangement, said plurality of layers comprising an internal sheath and one or more armouring layers, at least one armouring layer comprising at least one folded metal strip helically wound around said longitudinal axis of the pipe, and at least a part of said sensor arrangement being placed in a fold of said folded metal strip.

In most situations the longitudinal axis of the pipe will be a longitudinal axis of the pipe, namely in situations where the flexible pipe is for transportation of fluids. In some situations the longitudinal axis of the pipe is not hollow, namely in situations where the flexible pipe is an umbilical.

It should be emphasized that the term "comprises/comprising" when used in this specification is taken to specify the presence of stated features, integers, steps or components but does not preclude the presence or addition of one or more other stated features, integers, steps, components or groups thereof.

A folded strip is herein defined as an in principle endless unit with at least one fold and a width which in unfolded condition is at least 6 times its thickness, such as at least 10, such as at least 15, such as at least 25 times its thickness or even up to 100 or 500 times its thickness.

A profile is an in principle endless unit with a preshaped non-folded cross sectional profile. The profile may preferably have a width of less than 6 times its thickness. The term 'endless' is used to indicate that the tapes and profiles are very long compared to their other dimensions.

A wire is one of a strip which may or may not be folded and a profile.

The flexible pipe of the invention comprises a plurality of layers surrounding a hollow core, the plurality of layers comprising an internal sheath and one or more armouring layers, at least one armouring layer comprising at least one helically wound, folded metal strip.

As mentioned above the flexible pipe of the invention may have one or more armouring layers. The number and the placement of armouring layer or layers may e.g. be as it is well known from prior art e.g. as disclosed in U.S. Pat. No. 6,065,501, U.S. Pat. No. 5,813,439 and WO 01/81809. At least one of the armouring layers is an interlocked armouring layer formed from at least one profile and at least one folded metal strip with an at least partly integrated sensor arrangement.

The flexible pipe of the invention may in one embodiment comprise two or more armouring layers wound onto the internal sheath. The two armouring layers may e.g. be of wound wires, e.g. cross wound at angles to the centre axis of the pipe of 40-60 degrees, such as 45-58 degrees, such as 53-56 degrees to the centre axis of the pipeline. Such armouring layers of cross wound wires having angles of 40-60 degrees are often referred to as a pair of balanced traction layers. The flexible pipe may additionally comprise an inner armouring layer which in general is referred to as a carcass.

Any degrees mentioned herein should be taken to mean degrees in relation to the longitudinal axis of the pipe unless otherwise specified.

The directions towards or away from the longitudinal axis of the pipe should be taken to mean the radial direction toward the longitudinal centre axis of the pipe.

The edge sections of the folded metal strip should be taken to mean the two opposite edge sections extending essentially in the length direction of the strip and comprising at least one fold capable of engaging with a flange of the profile.

An inner armouring layer is an armouring layer which is placed inside the internal sheath and has the main purpose of preventing crushing of the pipe due to external forces. An inner armouring layer may be placed in direct contact with the inner side of the internal sheath, or one or more material layers e.g. a film and/or an insulating layer may be placed between the inner side of the internal sheath and the inner armouring layer.

An outer armouring layer is an outer armouring layer placed outside the internal sheath and has the main purpose of resisting pressure forces due to internal forces and/or resisting traction forces due to both internal and external forces. Typically a flexible pipe will comprise at least two outer armouring layers. An innermost outer armouring layer may be placed in direct contact with the outer side of the internal sheath, or one or more material layers e.g. a film may be placed between the outer side of the internal sheath and the innermost outer armouring layer. If the pipe comprises two or more outer armouring layers, these outer armouring layers may be placed in direct contact with each other or the two or more outer armouring layers may independently of each other be separated by one or more material layers e.g. film layer(s), intermediate sheath(s), insulation sheath(s) or similar.

For protection the flexible pipe may comprise an outer sheath, preferably of a polymer layer.

The flexible pipe of the invention may in one embodiment comprise an inner armouring layer and three or more outer armouring layers, wherein the innermost of the outer armouring layers is a vault of wound wires, wound at a steep angle to the centre axis of the pipe, e.g. above 80 degrees, such as above 90 degrees, and the other two armouring layers are of wound wires, cross wound at angles of 25-40, and 70-80 degrees, respectively.

The flexible pipe of the invention may comprise additional layers such as it is well known in the art, e.g. insulation layers of polymers, composite, cork or other, intermediate polymer sheaths or films and etc.

The flexible pipe of the invention may for example have a structure as described in any one of the prior art documents U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550, with the modification that at least one of the armouring layers comprises at least one folded metal strip with a sensor arrangement as described herein.

In prior art flexible pipes, folded metal strips have primarily been used in inner armouring layers which are often referred to as a carcass. However, also a few flexible pipes with outer armouring layers comprising folded metal strips have been disclosed, see for example U.S. Pat. No. 6,840,286, U.S. Pat. No. 6,668,867 and US 2004/0055550. According to the invention the flexible pipe may be as described in any one of this prior art flexible pipes comprising a folded metal strip with the modification that a sensor arrangement is at least partly integrated in the armouring layer comprising said folded metal strip.

The sensor arrangement may in principle be any kind of sensor arrangement which can be incorporated into the armouring layer. In one embodiment the sensor arrangement comprises an optical fibre.

The optical sensor preferably is an optical fibre sensor. Preferred optical fibre sensors include one or more of A-D:
A) Point sensors: the measurement is carried out at a single point in space, but possible multiple channels for addressing multiple points. Examples are Fabry-Perot sensors and single Fibre Bragg Grating (FBG) sensors.
B) Integrated sensors: the measurement averages a physical parameter over a certain spatial section and provides a single value. An example is a deformation sensor measuring strain over a long base length.
C) Quasi-distributed or multiplexed sensors: the measurement is determined at a number of fixed, discrete points along a single optical fibre cable. The most common examples are multiplexed FBG's.
D) Distributed sensor: the parameter of interest is measured with a certain spatial resolution at any point along a single optical cable. Examples include systems based on Rayleigh, Raman and Brillouin scattering.

A suitable sensor is the sensor as described in U.S. Pat. No. 7,024,941. Further information about optical sensors may e.g. be obtained from the Internet site provided by sensorland.com The optical fibre preferably is placed in a fold of said folded metal strip. It should be understood that parts of the optical fibre may be outside the folded metal strip, in particular one or both endings of the optical fibre may be outside the folded metal strip.

The uppermost end of the optical fiber may be arranged to be connected to a read out element and/or light feeding element. The lowermost part of the fiber may be integrated in an end-fitting which is also connected to the folded metal strip. The end-fittings may for example be as the end-fittings normally used for flexible pipes which have further been arranged to fix the end of the optical fibre.

In one embodiment the sensor arrangement comprises one or more transmission lines. One or more of these transmissions line may be placed in a fold of said folded metal strip.

In one embodiment the sensor arrangement comprises one or more electrical wires. These electrical wires may for example be placed in a fold of said folded metal strip.

The sensor arrangement should preferably be capable of sensing at least one property, preferably selected from the group of stress-strain, temperature, pipe leakage, wear, mechanical deformations e.g. which may lead to upheaval buckling, pressure, chemical corrosion, salt concentration of liquid in contact with the pipe and pH value of liquid in contact with the pipe.

The armouring layer into which the sensor arrangement is integrated may be an interlocked armouring layer or it may be a non-interlocked or only partly interlocked armouring layer. An interlocked armouring layer means that the individually wound wire(s) is/are locked a) to itself in consecutive windings if the armouring layer has only one wire, or b) to each other if the armouring layer has more than one wire. The wire(s) is/are preferably locked to itself/each other along its/their edges sections.

In one embodiment the armouring layer into which the sensor arrangement is integrated is a non-interlocked armouring layer made from one or more wires including at least one helically wound folded metal strip comprising an integrated sensor arrangement.

In one embodiment the armouring layer into which the sensor arrangement is integrated is a partly-interlocked interlocked armouring layer made from one or more wires including at least one helically wound folded metal strip comprising an integrated sensor arrangement. A partly-interlocked interlocked armouring layer means herein that at least in some of the windings adjacent wire windings are interlocked to each other.

In one embodiment the armouring layer comprises at least one helically wound folded metal strip, said folded metal strip being interlocked with itself in consecutive windings or interlocked with one or more additional helically wound metal element, wherein said additional helically wound metal element preferably comprises an additional folded metal strip and/or a profile.

In principle the integrated part of the sensor arrangement may be placed in any fold of the folded metal strip. By placing a part of the sensor arrangement (e.g. the optical sensor) in the fold of a strip, this part of the sensor arrangement will be well protected by the folded metal strip, and simultaneously the flexible pipe will remain flexible without risk of damaging the sensor arrangement. It is extremely simple to incorporate a part of the sensor arrangement into the folded metal strip. This may be done simply by folding the strip partly or totally around the part of the sensor arrangement to be integrated. According to the present invention the folded metal strip with the sensor arrangement may be prepared prior to the operation of winding the folded metal strip helically onto the pipe. In one embodiment the sensor arrangement may be incorporated into the strip after the strip has been pre-folded followed by a final folding of the folded metal strip. In one embodiment the sensor arrangement is incorporated into the strip simultaneously with the operation of folding the strip. In one embodiment the sensor arrangement is incorporated into the strip simultaneously with the operation of folding the strip and winding it helically around the pipe.

In one embodiment the folded metal strip is folded to have at least one box section, preferably at least a part of said sensor arrangement being placed in said box section.

Strips folded with a box section are e.g. described in U.S. Pat. No. 6,840,286, U.S. Pat. No. 6,668,867, and US 2004/0055550.

In one embodiment the folded metal strip is folded at least along one of its edges to form at least one folded edge section. Preferably at least a part of said sensor arrangement is placed in said folded edge section.

The folded metal strip with an edge fold may in principle be folded to form the edge sections with any shape, provided that they can engage with the lateral flange of the profile. In one embodiment the folded metal strip is folded against itself at least along one of its edges to form at least one edge section protruding in one of the directions towards or away from the longitudinal axis of the pipe.

In one embodiment the folded metal strip is folded along both of its edges to form the edge sections protruding in one of the directions towards or away from the longitudinal axis of the pipe. Preferably at least a part of said sensor arrangement is placed in one of said folded edge section.

The folding direction and the protruding direction may be essentially the same or they may be essentially opposite each other. The folding direction means the direction perpendicular to the surface of the non-folded part of the edge section of the folded metal strip and towards the folded part of the edge section.

In most situations it is desired that the folding direction and the protruding direction are essentially the same.

'One fold' means that the edge part is folded one time to form a two strip layered edge section. The two strip layered edge section may for example sandwich a part (e.g. an optical sensor) of the sensor arrangement.

In one embodiment the at least one folded metal strip is folded at least along one of its edges in at least one fold to form at least one edge section, preferably at least along one of its edge the at least one fold being folded around at least a part of said sensor arrangement.

In one embodiment the at least one folded metal strip is folded at least along one of its edges in at least two folds to form at least one edge section, preferably at least along one of its edges the at least two folds being folded around at least a part of said sensor arrangement.

In one embodiment the at least one folded metal strip is folded against itself to form at least one edge section comprising two or more layers of strip material, preferably said two or more layers of strip material being folded around at least a part of said sensor arrangement.

In one embodiment the at least one folded metal strip is folded at least along one of its edges so that said sensor arrangement is at least partly integrated into the fold.

In one embodiment the folded metal strip is folded at least along one of its edges so that a secondary element is integrated into the fold. In one embodiment the folded metal strip is folded at least along one of its edges so that a secondary element is integrated into the fold along one of its edges and an optical fiber of a sensor arrangement is integrated into the fold along the other one of its edges.

The folded metal strip may preferably be folded to form two edge sections and a non-folded mid-section between the two edge sections.

The non-folded mid-section may in principle have any shape and thickness within the limitation of a strip. However, in general it is preferred that the non-folded mid-section is essentially flat in order to allow the desired play between engaged profiles and folded metal strips.

In one embodiment the non-folded mid-section has an essentially uniform thickness.

The optimal thickness of the folded metal strip depends largely on the size of pipe, the intended use of the pipe and the strength of the metal used for the folded metal strip. If the pipe is large, the thickness of the folded metal strip should preferably be relatively large as well, e.g. even up to 16 mm. If the pipe is to be used as a riser, the thickness of the folded metal strip may preferably be larger than if the pipe is to be used as a flow line.

In most situations a thickness of the folded metal strip of about 5 mm or even about 2 mm is sufficient.

In one embodiment the non-folded mid-section has a non-folded thickness $T_{ns}$ of 0.2-5 mm, such as 0.2-2 mm.

In one embodiment the at least one folded metal strip has an essentially uniform thickness prior to folding. In the same embodiment (providing that there is more than one folded metal strip) or in another embodiment the at least one folded metal strip has a thickness which is varying in its width direction.

The folded layers of the edge section of the folded metal strip may e.g. have a thickness which is different from the non-folded mid-section. Thus in one embodiment the folded layers of the edge section of the folded metal strip have a thickness of between 0.5 and 1.5 times the thickness of the non-folded mid-section. In principle the edge sections may thus each have an edge sections thickness $T_{fs}$ of down to one time the thickness of the non-folded mid-section $T_{ns}$. However, in practice it is desired that the edge sections are thicker than the non-folded mid-section $T_{ns}$.

In one embodiment the edge sections each have an edge section thickness $T_{fs}$ of 1.5 to 10 times the thickness of the non-folded mid-section $T_{ns}$, such as of 3-4 times the thickness of the non-folded mid-section $T_{ns}$.

In one embodiment the armouring layer comprises two or more folded metal strips which are interlocked with each other.

The folded metal strip may in principle be made from any metal which can be folded and which has a sufficient strength to hold together profiles by engagement as described above. Preferably the folded metal strip is made from a relatively high nobility. Preferred metals for the folded metal strip include steel and steel alloys, e.g. a duplex steel.

In one embodiment the armouring layer comprises at least one folded metal strip and at least one profile which are interlocked with each other.

In one embodiment the armouring layer incorporating the sensor arrangement may be as described in applicant's co-pending application DK PA 2006 01706 from which this present patent application claims priority. The armouring layer may thus comprise at least one profiled wire and at least one folded metal strip, said at least one profiled wire and said at least one folded metal strip being helically wound and interlocked with each other and at least a part of the sensor arrangement being placed in a fold of the folded metal strip. The profile (profiled wire) may be as described in PA 2006 01706. The folded metal strip may be as described in PA 2006 01706 with the proviso that at least a part of the sensor arrangement is placed in a fold of the folded metal strip.

The profile in this embodiment may in principle be of any material which has the sufficient strength for providing the armouring layer. The material for the profile may e.g. be selected from the group consisting of composite materials and metals. In one embodiment the profile is of metal, such as steel or a steel alloy, e.g. a duplex steel.

In one embodiment the armouring layer incorporating the sensor arrangement may be as described in applicant's Danish patent application filed simultaneously with this application. The armouring layer may thus comprise at least one folded metal strip, which folded metal strip is interlocked with itself in consecutive windings or interlocked with another helically wound metal strip, said at least one folded metal strip being folded along both of its edges to form protruding edge sections of two or more strip material layers, each of said protruding edge sections protruding in one of the directions towards or away from the longitudinal axis of the pipe. The folded metal strip may be as described in applicant's Danish patent application filed simultaneously with this application with the proviso that at least a part of the sensor arrangement is placed in a fold of the folded metal strip.

The sensor arrangement may preferably be at least partly fixed in at least one fold of the folded metal strip. By fixing the sensor arrangement in the folded metal strip the sensor arrangement may be even further protected against damage. Certain sensor arrangement needs to be fixed to at least one point for performing its measurement, e.g. stress-strain sensors.

In one embodiment the sensor arrangement is fixed along the major part of the length of said folded metal strip.

In one embodiment at least a part of said sensor arrangement is fixed at a plurality of fix points along the length of said folded metal strip.

The sensor arrangement may be fixed using any means. In one embodiment at least a part of the sensor arrangement is fixed by clamping provided by the folded metal strip. In one embodiment at least a part of the sensor arrangement is fixed to said folded metal strip by gluing.

The gluing may be provided by any glue which is compatible with the strip material and the sensor material. The glue may preferably be or comprise a polymer material. Preferred polymer types for the polymer material are an epoxy type, a vinyl ester epoxy, a polyurethane or mixtures containing one or more of these. Said polymers fulfil the requirements of the liquid according to the invention. However, other liquids fulfilling the requirements may also be used according to the invention. The skilled person will be able to select suitable liquids to be used according to the invention as a matter of routine. The polymer material may preferably be fluorinated completely or partly. Such treatment may improve the properties of the polymer material with regard to wear resistance, chemical resistance and resistance towards elevated temperatures.

Furthermore, it is preferred that the polymer material is cross-linked completely or partly. Cross-linking may improve strength and may be initiated by heat, peroxides or other chemicals e.g. sulphur compounds.

In one embodiment the flexible pipe comprises an inner armouring layer (carcass) surrounded by said internal sheath, at least a part of the sensor arrangement being integrated in said inner armouring layer.

In one embodiment the flexible pipe comprises an outer armouring layer surrounding said internal sheath, at least a part of said sensor arrangement being integrated in said outer armouring layer. The outer armouring layer may e.g. be a tensile armouring layer, pressure armouring layer (pressure vault) and/or a balanced tensile and pressure armouring layer.

In one embodiment one of the armouring layers is an interlocked armouring layer formed from at least one profile and at least one folded metal strip comprising at least an incorporated part of a sensor arrangement. This could preferably be an inner armouring layer or it could be an innermost outer armouring layer, e.g. a vault.

In one embodiment two or more of the armouring layers are interlocked armouring layers each formed from at least one profile and at least one folded metal strip comprising at least an incorporated part of a sensor arrangement. This could preferably include an inner armouring layer and/or an innermost outer armouring layer, e.g. a vault.

The profile in any armouring layer may in principle have any profiled shape. Preferred shapes of the profile include the shape of the profiles as disclosed in any one of the publications U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat.

No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550. More preferably the profile(s) has/have a profile selected from the group consisting of Z-shaped profiles, U-shaped profiles, X-shaped profiles, I-shaped profiles, H-shaped profiles and T-shaped profiles.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

Figure 1:
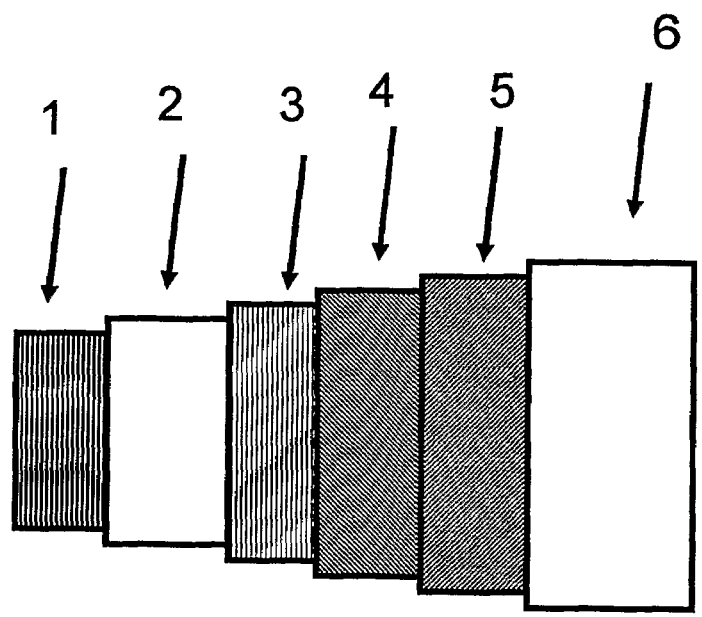
FIG. 1 is a schematic side view of a pipe with a carcass.

The flexible pipe shown in FIG. 1 comprises an internal sheath 2, often also called an inner liner, e.g. of cross linked PE. Inside the inner liner 2 the pipe comprises an inner armouring layer 1, called a carcass. On the outer side of the inner liner 2, the flexible pipe comprises three outer armouring layers 3, 4, 5. The inner armouring layer 3 closest to the inner liner 2, is a pressure armouring layer 3, made from profiles and/or strips wound at a steep angle to the centre axis of the pipe, e.g. close to 90 degrees. Around the pressure armouring layer 3, the pipe comprises a pair of cross wound tensile armouring layers 4, 5, made from wound profiles and/or strips, wherein one of the tensile armouring layers 4 has an angle above 55 degrees, typically between 60 and 75 degrees, and wherein the other one of the tensile armouring layers 5 has an angle below 55 degrees, typically between 30 and 45 degrees. The piper further comprises an outer polymer layer 6 protecting the armouring layer mechanically and/or against ingress of sea water.

At least one of the armouring layers 2, 3, 4, 5 comprises at least one folded metal strip with a sensor arrangement as described above.

Figure 2:
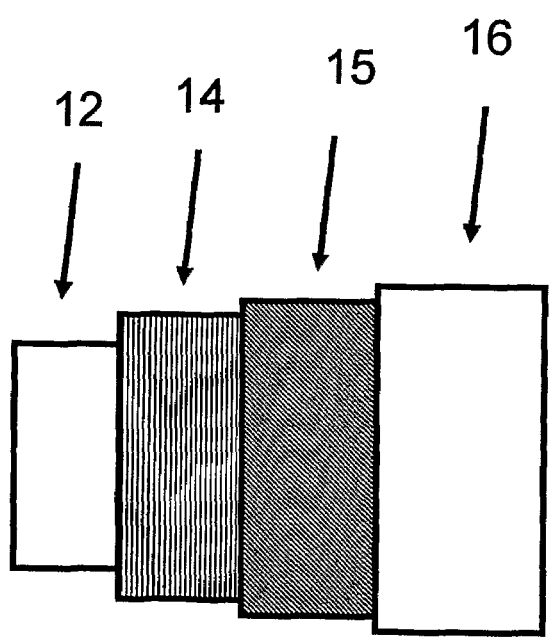
FIG. 2 is a schematic side view of a pipe without a carcass.

FIG. 2 shows another pipe design. This flexible pipe comprises an inner liner 12 and a pair of outer armouring layers, 14, 15, in the form of profiles and/or strips wound around the inner liner 12. The two armouring layers are cross wound at an angle to the centre axis of the pipe of close to 55 degrees, typically one of the layers is wound at an angle slightly less than 55 degrees, e.g. between 52 and 55 degrees, and the other of them is wound at an angle slightly more than 55 degrees e.g. between 55 and 57. The pipe further comprises an outer polymer layer 16 protecting the armouring layer mechanically and/or against ingress of sea water.

At least one of the armouring layers 14, 15 comprises at least one folded metal strip with a sensor arrangement as described above.

Figure 3A:
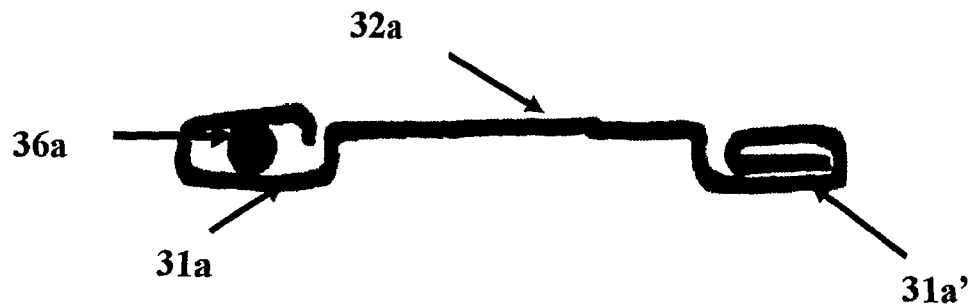
FIGS. 3a-3h are schematic cross sectional side views of a different folded metal strip with sensor arrangement(s), which can be a part of an armouring layer of the flexible pipe of the invention.

FIG. 3a shows a cross sectional side view of a folded metal strip useful in a pressure vault of the pipe of the invention. The metal strip is folded to form two edge sections 31a, 31a', both protruding in the same direction, namely in the opposite direction than the folding direction. The metal strip is folded against itself in two folds along one of its edges 31a'. Along its other edge the folded metal strip is folded around a fiber 36a of a sensor arrangement. The strip further comprises a non-folded mid-section 32a, between the two edge sections 31a, 31a'.

Figure 3B:

FIG. 3b shows a cross sectional side view of another folded metal strip. The metal strip is folded to form two edge sections 31b, 31b', both protruding in the folding direction. The metal strip is folded against itself in two folds along one of its edges 31b'. Along its other edge the folded metal strip is folded around a fiber 36b of a sensor arrangement.

Figure 3C:

FIG. 3c shows a cross sectional side view of another folded metal strip. The metal strip is folded to form two edge sections 31c, 31c', both protruding in the folding direction. The metal strip is folded against itself in three folds along one of its edges 31c'. Along its other edge the folded metal strip is folded around a fiber 36c of a sensor arrangement in two folds.

Figure 3D:
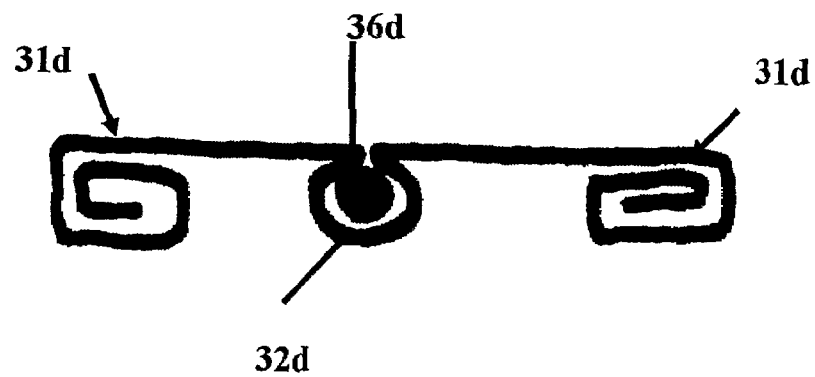

FIG. 3d shows a cross sectional side view of another folded metal strip. The metal strip is folded to form two edge sections 31d, both protruding in the folding direction. The metal strip is folded against itself along its edges in three folds for each of the edge sections 31d whereby each protruding edge section 31d has 4 or more strip material layers. At the mid section between the two edge sections 31d, the folded metal strip comprises a box shaped fold 32d into which a fiber 36d of a sensor arrangement has been incorporated.

Figure 3E:

FIG. 3e shows a cross sectional side view of another folded metal strip, where the metal strip is folded to form two edge sections 31e, 31e', both protruding in the same direction. The metal strip is in each of its edge sections 31e, 31e' folded against a secondary element 35e, 36e, which elements are thereby integrated in the fold. One of the secondary elements is a reinforcement element 53e, the other one of the secondary elements is a fiber 36e of a sensor arrangement.

Figure 3F:
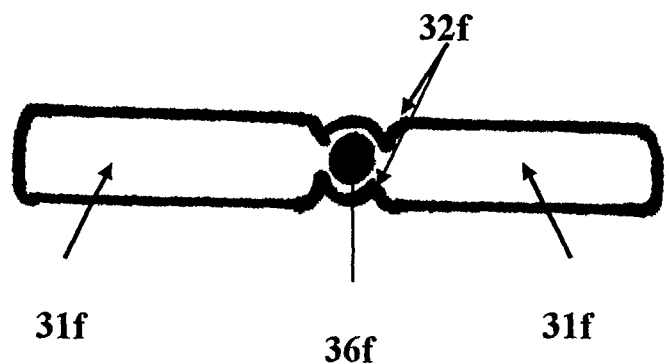

FIG. 3f shows a cross sectional side view of another folded metal strip. This folded strip does not comprise any protruding edge section for interlocking purposes and is thus to be applied in a non-interlocked or partly-interlocked armouring layer. The metal strip is to form two box shaped sections 31f. At the mid section between the two box shaped sections 31f, the metal strip is folded to form two pairs of opposite protruding tops 32f which tops 32f holds and possibly fix a fiber 36f of a sensor arrangement.

Figure 3G:
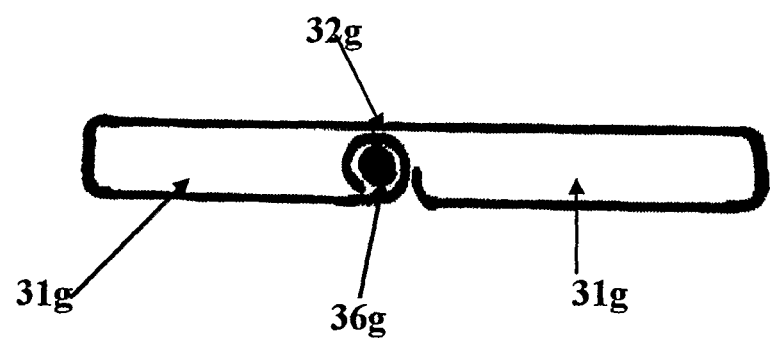

FIG. 3g shows a cross sectional side view of another folded metal strip. This folded strip does not comprise any protruding edge section for interlocking purposes and is thus to be applied in a non-interlocked or partly-interlocked armouring layer. The metal strip is to form a box shape 31g. At the mid section between the two edges of the box shaped folded strip, the metal strip is folded against itself to form a fold 32g into which a fiber 36g of a sensor arrangement has been incorporated.

Figure 3H:
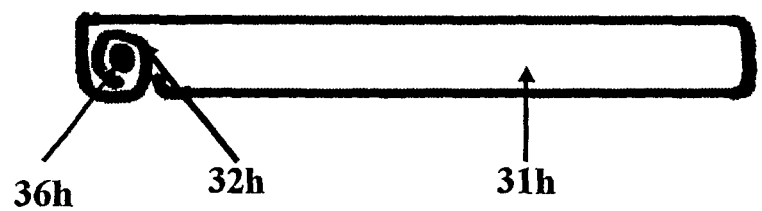

FIG. 3h shows a cross sectional side view of another folded metal strip. This folded strip does not comprise any protruding edge section for interlocking purposes and is thus to be applied in a non-interlocked or partly-interlocked armouring layer. The metal strip is to form a box shape 31h. Adjacent to one of the two edges of the box shaped folded strip, the metal strip is folded against itself to form a fold 32h into which a fiber 36h of a sensor arrangement has been incorporated.

Figure 4:
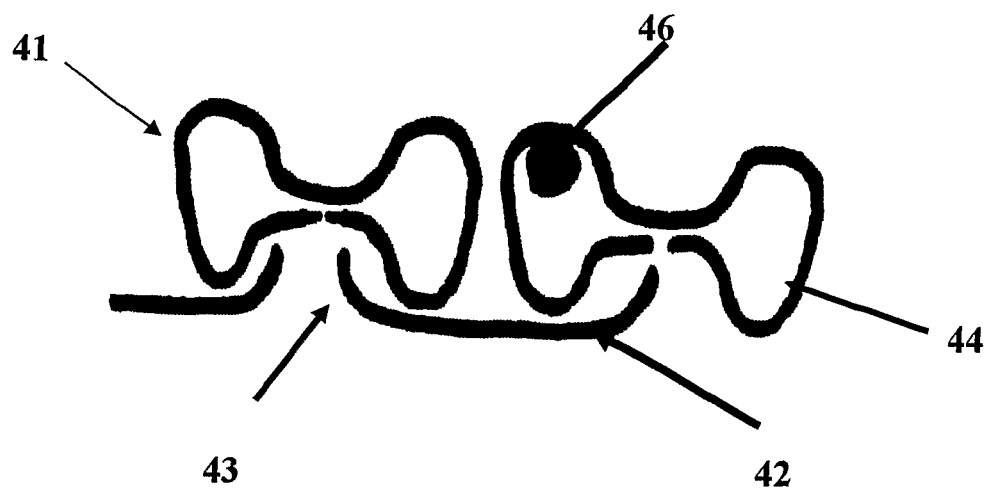
FIG. 4 is a schematic cross sectional side view of a first armouring layer comprising a folded metal strip with a sensor arrangement.

FIG. 4 shows a first armouring layer of a flexible pipe of the invention comprising helically wound, interlocked folded strips 41, 42. The armouring layer comprises 2 or more (an even number—in the drawing at least 4) folded metal strips 41, 42, where half of the folded metal strips 41 are folded to have two box shaped folds 44, and the other half of the folded metal strips 42 are only slightly folded along their edges in folds 43 to hold together consecutive windings of the first folded metal strip type 41. In one of the box shaped folds of one of the folded metal strips 41a fiber 46 of a sensor arrangement has been placed.

Figure 5:
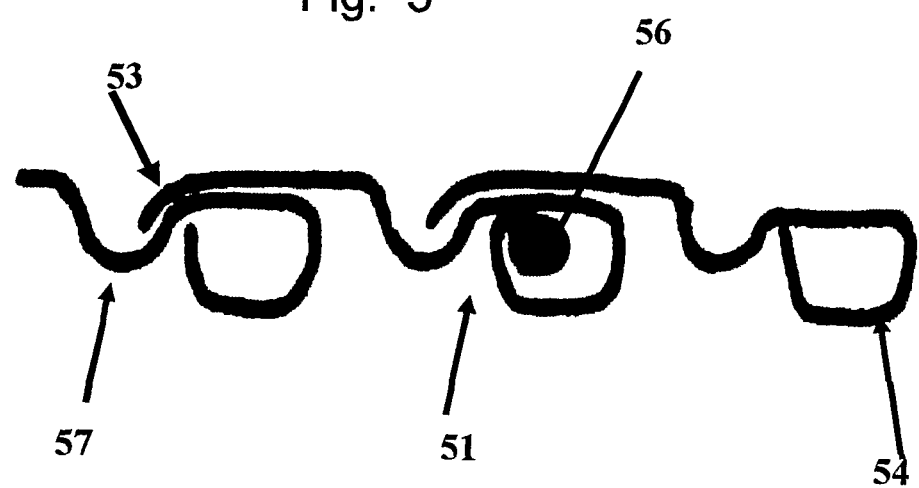
FIG. 5 is a schematic cross sectional side view of a second armouring layer comprising a folded metal strip with a sensor arrangement.

FIG. 5 shows a second armouring layer of a flexible pipe of the invention comprising one or more helically wound, interlocked folded strips 51 (in the drawing at least 3). The helically wound strip(s) 51 comprises a box shaped fold 54 along one of its edges and a slightly folded fold 53 along the other one of its edge. In its mid section the helically wound strip(s) 51 comprises a groove 57 which is engaged with the slightly folded fold 53 of another folded metal strip. In the box shaped fold 54 of one of the folded metal strips 51a fiber 56 of a sensor arrangement has been placed.

Figure 6:
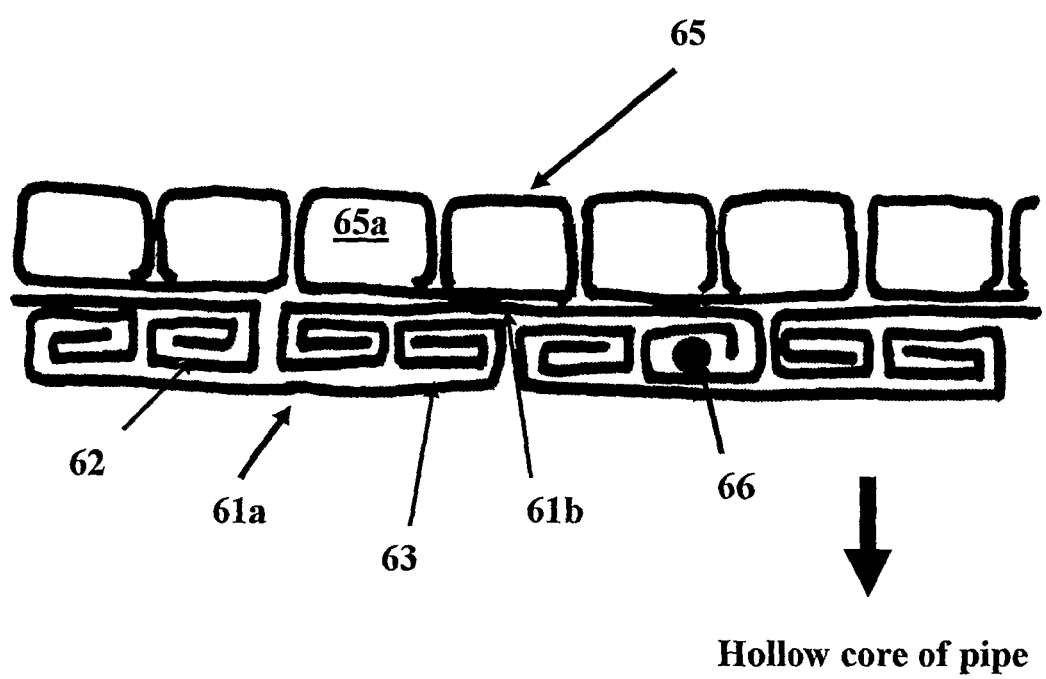
FIG. 6 is a schematic cross sectional side view of a third armouring layer comprising a folded metal strip with a sensor arrangement.

FIG. 6 shows a third armouring layer of a flexible pipe of the invention comprising interlocked folded strips 61a, 61b. The armouring layer comprises 2 or more (an even number) folded metal strips 61a, 61b. At least one of the folded metal strips 61b is as the folded metal strip comprising an incorporated fiber 66 of a sensor arrangement. The folded metal strips 61a, 61b are turned opposite each other so that half of the folded metal strips 61a, 61b comprise protruding edge sections 62 protruding towards the hollow core of the pipe and the other half of the folded metal strips 61a, 61b comprise protruding edge sections 63 protruding away from the longitudinal axis of the pipe (here the hollow core). The folded metal strips 61a, 61b are wound helically onto the pipe so that the protruding edge sections 63 protruding away from the hollow core of the pipe are interlocked with protruding edge sections 62 protruding towards the hollow core of the pipe. The folded metal strip(s) 61b comprises an integrated fibre 66, which is folded into one of its protruding edge sections. The pressure armouring layer comprises a hoop layer provided by a helically wound wire 65 (hoop wire), which in this embodiment is made from a formed strip such as a metal strip, which has been formed to have one or more box sections 65a. The hoop wire 65 increases the moment of inertia.

The invention claimed is:

1. A flexible pipe comprising a plurality of layers surrounding a longitudinal axis and an at least partly integrated sensor arrangement, said plurality of layers comprising an internal sheath and one or more armouring layers, at least one armouring layer comprising at least one folded metal strip helically wound around said longitudinal axis of the pipe, at least a part of said sensor arrangement being placed in a fold of said folded metal strip, said at least one folded metal strip is folded at least along one of its edges in at least one fold to form at least one edge section and the at least one fold being folded around at least a part of said sensor arrangement.

2. The flexible pipe as claimed in claim 1 wherein said sensor arrangement comprises an optical fibre.

3. The flexible pipe as claimed in claim 1 wherein said sensor arrangement comprises one or more transmission lines.

4. The flexible pipe as claimed in claim 1 wherein said sensor arrangement comprises one or more electrical wires.

5. The flexible pipe as claimed in claim 1 wherein said sensor arrangement is capable of sensing at least one property.

6. The flexible pipe as claimed in claim 1 wherein said armouring layer is a non-interlocked or a partly-interlocked armouring layer.

7. The flexible pipe as claimed in claim 1 wherein said armouring layer is an interlocked armouring layer.

8. The flexible pipe as claimed in claim 1 wherein said armouring layer comprises at least one helically wound folded metal strip, said folded metal strip being interlocked with itself in consecutive windings or interlocked with one or more additional helically wound metal elements.

9. The flexible pipe as claimed in claim 1 wherein said folded metal strip is folded to have at least one box section, at least a part of said sensor arrangement being placed in said box section.

10. The flexible pipe as claimed in claim 1 wherein said folded metal strip is folded at least along one of its edges to form at least one folded edge section, at least a part of said sensor arrangement being placed in said folded edge section.

11. The flexible pipe as claimed in claim 10, wherein the at least one folded metal strip is folded at least along one of its edges in at least two folds to form at least one edge section.

12. The flexible pipe as claimed in claim 10, wherein the at least one folded metal strip is folded against itself to form at least one edge section comprising two or more layers of strip material.

13. The flexible pipe as claimed in claim 10, wherein the at least one folded metal strip is folded at least along one of its edges so that said sensor arrangement is at least partly integrated into the fold.

14. The flexible pipe as claimed in claim 1 wherein said folded metal strip is folded at least along one of its edges to form at least one edge section protruding in one of the directions towards or away from the longitudinal axis of the pipe.

15. The flexible pipe as claimed in claim 14, wherein the at least one folded metal strip is folded along both of its edges to form the edge sections, each edge section protruding in one of the directions towards or away from the longitudinal axis of the pipe.

16. The flexible pipe as claimed in claim 1 wherein said folded metal strip at least along one of its edges is folded against itself to form at least one edge section protruding in one of the directions towards or away from the longitudinal axis of the pipe.

17. The flexible pipe as claimed in claim 16, wherein the at least one folded metal strip is folded at least along one of its edges in a folding direction.

18. The flexible pipe as claimed in claim 16, wherein the at least one folded metal strip is folded against itself in at least along one of its edges in at least one fold.

19. The flexible pipe as claimed in claim 1, wherein said at least one folded metal strip is folded to form two edge sections and a non-folded mid-section between the two edge sections.

20. The flexible pipe as claimed in claim 1, wherein said at least one folded metal strip has an essentially uniform thickness prior to folding.

21. The flexible pipe as claimed in claim 1, wherein said at least one folded metal strip has a thickness which is varying in its width direction.

22. The flexible pipe as claimed in claim 1, wherein said at least one armouring layer comprises two or more folded metal strips which are interlocked with each other.

23. The flexible pipe as claimed in claim 1, wherein said at least one armouring layer comprises at least one folded metal strip and at least one profile which are interlocked with each other.

24. The flexible pipe as claimed in claim 1, wherein at least a part of said sensor arrangement is fixed in at least one fold of said folded metal strip.

25. The flexible pipe as claimed in claim 24, wherein at least a part of said sensor arrangement is fixed along the major part of the length of said folded metal strip.

26. The flexible pipe as claimed in claim 24, wherein at least a part of said sensor arrangement is fixed at a plurality of fix points along the length of said folded metal strip.

27. The flexible pipe as claimed in claim 24, wherein at least a part of said sensor arrangement is fixed by clamping provided by said folded metal strip.

28. The flexible pipe as claimed in claim 24, wherein at least a part of said sensor arrangement is fixed to said folded metal strip by gluing.

29. The flexible pipe as claimed in claim 1, wherein said flexible pipe comprises an inner armouring layer (carcass) surrounded by said internal sheath, at least a part of said sensor arrangement being integrated in said inner armouring layer.

30. The flexible pipe as claimed in claim 1, wherein said flexible pipe comprises an outer armouring layer surrounding said internal sheath, at least a part of said sensor arrangement being integrated in said outer armouring layer.

31. A flexible pipe as claimed in claim 30 wherein said armouring layer is a tensile armouring layer.

32. The flexible pipe as claimed in claim 30 wherein said armouring layer is a pressure armouring layer (pressure vault).

33. The flexible pipe as claimed in claim 30 wherein said armouring layer is a balanced tensile and pressure armouring layer.

34. The flexible pipe as claimed in claim 1 wherein said sensor arrangement comprises at least one transmission line placed in a fold of said folded metal strip.

35. The flexible pipe as claimed in claim 1 wherein said sensor arrangement comprises at least one electrical wire placed in a fold of said folded metal strip.

36. The flexible pipe as claimed in claim 1 wherein said sensor arrangement is capable of sensing at least one property selected from stress-strain, temperature, pipe leakage, wear, mechanical deformations, pressure, chemical corrosion, salt concentration of liquid in contact with the pipe or pH value of liquid in contact with the pipe.

* * * * *

UNITED STATES PATENT AND TRADEMARK OFFICE
CERTIFICATE OF CORRECTION

PATENT NO. : 8,474,489 B2  
APPLICATION NO. : 12/520704  
DATED : July 2, 2013  
INVENTOR(S) : Jonas Gudme Page 1 of 1

It is certified that error appears in the above-identified patent and that said Letters Patent is hereby corrected as shown below:

On the Title page; item (73); please delete "National Oilwell Varco Denmark" and add
-- National Oilwell Varco Denmark, I/S --

Signed and Sealed this
Seventeenth Day of September, 2013

Teresa Stanek Rea
*Deputy Director of the United States Patent and Trademark Office*